(12) United States Patent
Østervig

(10) Patent No.: US 9,689,410 B2
(45) Date of Patent: Jun. 27, 2017

(54) RAILING SYSTEM

(71) Applicant: Dolle A/S, Frøstrup (DK)

(72) Inventor: Viggo Østervig, Frøstrup (DK)

(73) Assignee: Dolle A/S, Frøstrup (DK)

( * ) Notice: Subject to any disclaimer, the term of this patent is extended or adjusted under 35 U.S.C. 154(b) by 169 days.

(21) Appl. No.: 14/458,501

(22) Filed: Aug. 13, 2014

(65) Prior Publication Data

US 2015/0204103 A1 Jul. 23, 2015

(30) Foreign Application Priority Data

Jan. 22, 2014 (DK) .................................. 2014 00040

(51) Int. Cl.
| | | |
|---|---|---|
| *E04H 17/00* | (2006.01) | |
| *F16B 1/00* | (2006.01) | |
| *E04H 17/24* | (2006.01) | |
| *E04F 11/18* | (2006.01) | |

(52) U.S. Cl.
CPC ............ *F16B 1/00* (2013.01); *E04F 11/1859* (2013.01); *E04H 17/24* (2013.01)

(58) Field of Classification Search
CPC ......... E04F 11/1859; E04H 17/24; F16B 1/00
USPC ............ 256/19, 22, 24, 59, 65.01, 65.15, 69
See application file for complete search history.

(56) References Cited

U.S. PATENT DOCUMENTS

| | | | |
|---|---|---|---|
| 309,566 A | 12/1884 | Schad et al. | |
| 1,772,159 A | 8/1930 | Roth | |
| 2,129,030 A | 9/1938 | Robinson | |
| 2,855,227 A | 10/1958 | Bottom | |
| 3,387,417 A | 6/1968 | Howlett | |
| 3,405,914 A | 10/1968 | Nill | |
| 3,952,453 A | 4/1976 | Amburgey | |
| 3,980,275 A | 9/1976 | Sanchez | |
| 3,990,182 A | 11/1976 | Linder | |
| 4,223,413 A | 9/1980 | Dresher et al. | |
| 4,352,485 A | 10/1982 | Basey | |
| 4,438,612 A | 3/1984 | Bernard et al. | |
| 4,533,121 A | 8/1985 | Basey | |
| 4,886,245 A | 12/1989 | Manzo | |
| 4,955,309 A | 9/1990 | Ciccone et al. | |
| 5,116,159 A | 5/1992 | Kern et al. | |
| D360,954 S * | 8/1995 | Von Parrish | ................. D25/121 |
| 5,613,664 A * | 3/1997 | Svalbe | ................. E04H 17/003 |
| | | | 256/19 |
| 5,649,688 A * | 7/1997 | Baker | ................. E04F 11/181 |
| | | | 256/21 |

(Continued)

*Primary Examiner* — Gregory Binda
*Assistant Examiner* — Nahid Amiri
(74) *Attorney, Agent, or Firm* — Fredrikson & Byron, P.A.

(57) ABSTRACT

A railing system for mounting to railings of a fence includes a first strip and a second strip. The first and second strips each have a generally planar surface. The first and second strips can be mounted to respective fence railings. The first and second strips each have a plurality of openings extending for receiving a plurality of anchors. Each anchor has a flared portion to prevent passage of the flared portion through the respective opening and anchor the anchor against one of the first and second strips. A plurality of elongated barriers each of a fixed length extends from the first strip to the second strip when mounted to respective fence railings. Each barrier is connectable to a pair of anchors, and when connected to respective anchors, extends linearly from the first strip to the second strip.

18 Claims, 14 Drawing Sheets

(56) References Cited

U.S. PATENT DOCUMENTS

| | | | |
|---|---|---|---|
| 5,692,416 A | 12/1997 | Hamblin | |
| 6,494,438 B1* | 12/2002 | Noirot | E04F 11/1812 256/19 |
| 6,679,480 B1 | 1/2004 | Hara et al. | |
| 6,814,523 B1 | 11/2004 | Nilsson | |
| 6,843,613 B2 | 1/2005 | Gelfand et al. | |
| 6,889,960 B1 | 5/2005 | Jones | |
| 6,932,329 B1* | 8/2005 | Harder | E04F 11/1834 256/19 |
| 6,938,962 B1 | 9/2005 | Schlanger | |
| 7,044,448 B1* | 5/2006 | Jones | E04F 11/181 256/19 |
| 7,386,960 B2* | 6/2008 | Molteni | E04B 2/7433 160/135 |
| 7,441,750 B1 | 10/2008 | Harder | |
| 7,478,799 B2* | 1/2009 | Viviano | E04F 11/1842 256/59 |
| 7,591,446 B2 | 9/2009 | Istas et al. | |
| 7,762,533 B2* | 7/2010 | DeRogatis | E04F 11/181 256/22 |
| 7,889,075 B2 | 2/2011 | Winkler et al. | |
| 7,913,983 B1 | 3/2011 | Sandor, Sr. | |
| 7,971,412 B1 | 7/2011 | Lim | |
| 8,056,885 B2 | 11/2011 | Sandor, Sr. | |
| 8,251,604 B2 | 8/2012 | Rolle | |
| 8,348,242 B2 | 1/2013 | Rock | |
| 8,356,803 B2 | 1/2013 | Truckner | |
| 8,534,132 B1 | 9/2013 | Purdy | |
| 8,572,849 B1 | 11/2013 | Clark | |
| 9,169,651 B1* | 10/2015 | Wynne | E04F 11/1834 |
| 2003/0173474 A1* | 9/2003 | Taylor | A45F 3/44 248/156 |
| 2006/0032338 A1 | 2/2006 | Perry | |
| 2006/0076545 A1* | 4/2006 | Reynders | E04F 11/1842 256/59 |
| 2006/0151760 A1 | 7/2006 | Vyvyan-Vivian | |
| 2007/0200105 A1* | 8/2007 | Williams | B21D 39/044 256/22 |
| 2007/0246698 A1* | 10/2007 | Truckner | E04F 11/1834 256/67 |
| 2009/0321704 A1 | 12/2009 | Chung | |
| 2010/0012910 A1 | 1/2010 | Napier | |
| 2011/0109025 A1 | 5/2011 | Sechler | |
| 2012/0168703 A1 | 7/2012 | Napier | |

* cited by examiner

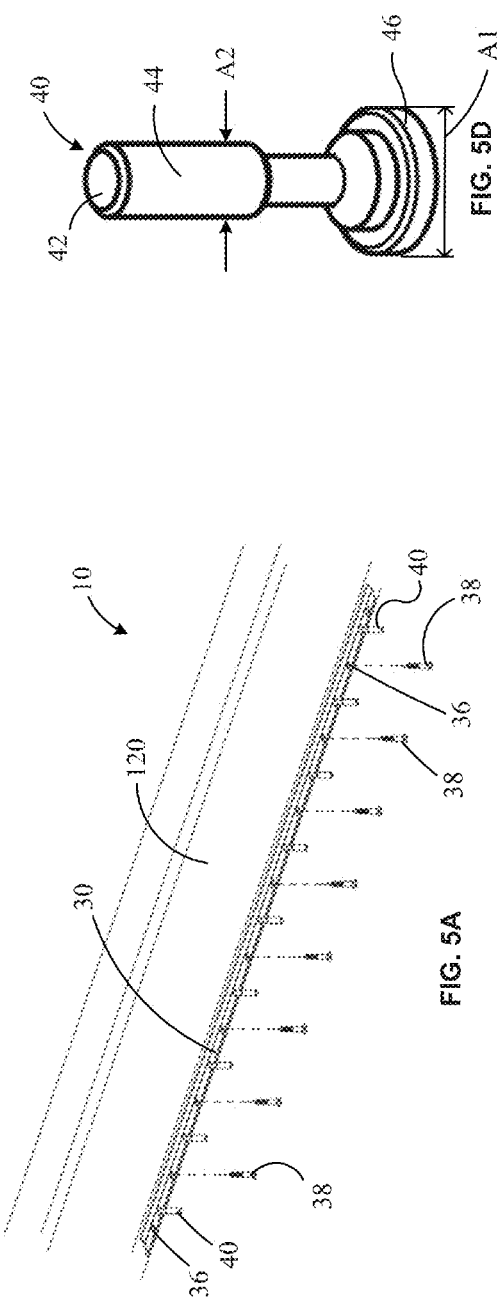
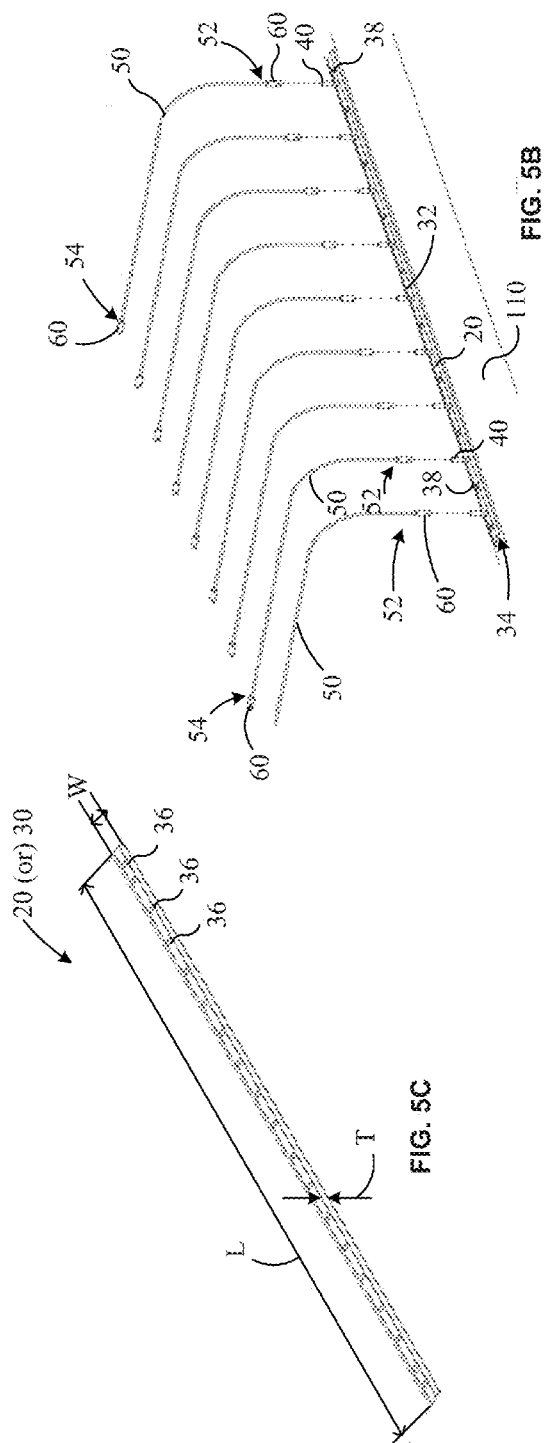

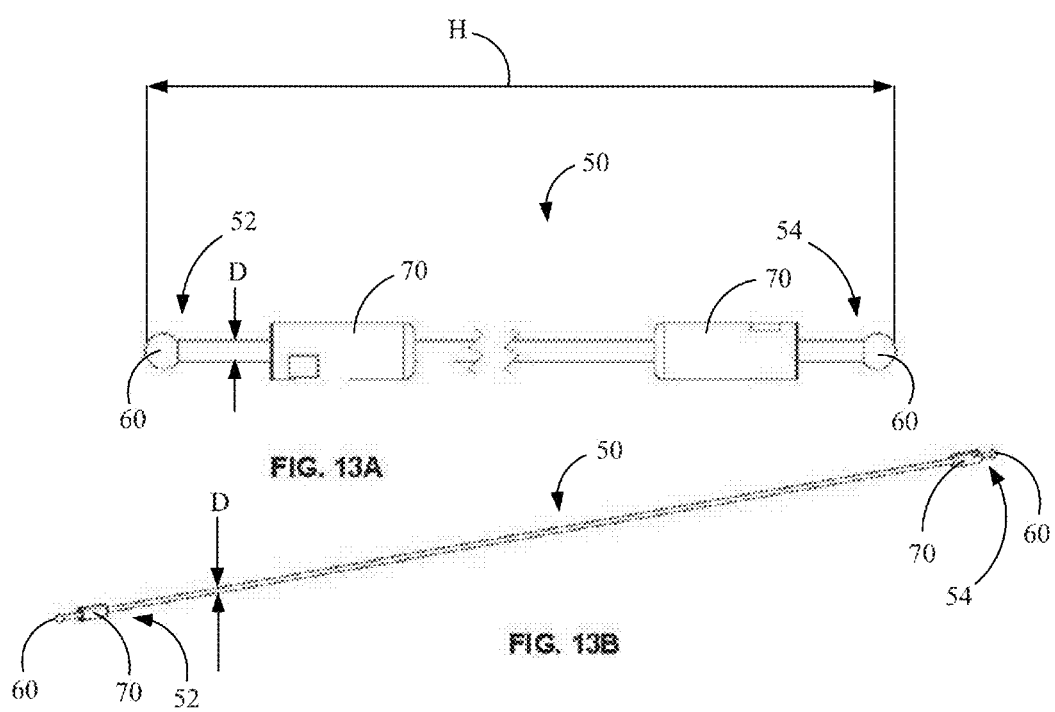

RAILING SYSTEM

RELATED APPLICATIONS

This application claims priority to Danish patent application, PA 201400040, filed on Jan. 22, 2014, the disclosure of which is hereby incorporated by reference in its entirety.

FIELD

This disclosure generally relates to systems and method for forming protective barriers with fences. More particularly this disclosure relates to a railing system mounted to railings of a fence.

BACKGROUND

Homes, offices, buildings, and public or recreational areas (e.g., parks, bridges and the like) use fencing to form protective barriers for stairways, decks, balconies and the like. Such systems are useful for preventing children, pets and adults from unintentionally stepping into dangerous areas (e.g., a balcony or a bridge). Typically, such systems involve balusters (e.g., made of wood, metal, or plastic) mounted to railings. Several types of railing systems are known. In one example, the railing system has horizontal barriers extending between generally vertically-oriented railings. In such cases, children or pets may accidentally step on the horizontal barriers and endanger themselves. Vertical barriers on the other hand, prevent users from climbing on to the railing system. In some examples, at least a portion of the railing system can be partially transparent, so that the barriers provide a view past the fence. One type of vertical railing systems include metal balusters that are mounted separately to railings by bolting or welding. Other railings systems can include balusters made of wood or polymer materials that are mounted between wood or polymer moldings. For instance, the railing system may include pickets fastened (e.g., threaded, friction or press-fitted) in appropriate holes in the railings.

Conventional railing systems are bulky and have a labor-intensive assembly procedure. Additionally, if railings or balusters suffer damage (e.g., due to user negligence or accidents) removing and replacing damaged balusters can be time consuming. As conventional balusters are often fitted within holes in the railings, removing a single baluster can damage the railings and/or adjacent balusters. Thick balusters and pickets also block any views past them and lead to a cluttered and/or bulky look.

SUMMARY OF THE INVENTION

Certain embodiments of the invention include a railing system for mounting to railings of a fence. The railing system can include a first strip and a second strip, each having a first surface and a generally planar second surface opposite the first surface. The first and second strips can be mounted to respective fence railings. Each second surface can face and engage a railing of a fence. The first and second strips can each define a length and a width and can have a thickness substantially less than the length or the width. The thickness of the first and second strips can be generally uniform along the length. The first and second strips can each have a plurality of openings extending therethrough.

In one embodiment, the railing system can include a plurality of anchors. Each anchor can have a leading edge, a shank and a flared portion. The leading edge and the shank can have a cross-sectional area less than a cross-sectional area of the respective opening to permit the leading edge and the shank to extend, in a direction from the second surface to the first surface, through a respective opening of one of the first or second strips. The flared portion can have a cross-sectional area greater than the cross-sectional area of the respective opening to prevent passage of the flared portion through the respective opening and anchor the anchor against the second surface of the one of the first and second strips.

In one embodiment, the railing system includes a plurality of elongated barriers. Each barrier can have a fixed length to extend from the first strip to the second strip when mounted to respective fence railings. Each barrier can have a first end and a second end. The first end can be connectable to one of the anchors when anchored to the first strip and the second end can be connectable to one of the anchors when anchored to the second strip. Each barrier, when connected to respective anchors, can extend linearly from the first strip to the second strip.

In one embodiment, the railing system can include a plurality of sleeves. Each sleeve can be connectable with the shank of a respective anchor. Each sleeve can have a hollow portion. In such cases, the first and second ends of each barrier can be receivable by the hollow portion of a respective sleeve. The first end can be connectable to the first strip and the second end can be connectable to the second strip when received by the hollow portion of a respective sleeve. Each barrier, when connected to respective strips, can extend linearly from the first strip to the second strip.

Certain embodiments of the invention also include a method of mounting a railing system to railings of a fence. The method can involve the step of providing a railing system according to any of the embodiments disclosed herein. The anchor can be positioned on the first and second strips such that the leading edge and shank extend in a direction from the second surface to the first surface and the flared portion is prevented from passing through the respective opening so that the flared portion anchors the anchor against the second surface of the one of the first and second strips. The first and second strips can then be mounted to respective railings of the fence such that each second surface faces and engages a respective railing of a fence. The flared portions of each anchor can be captured between first or second strip and the respective railing when the first and second strips have engaged with respective railings. The shank of each anchor can be bent with respect to its flared portion to a desired angle. The first and second ends of each elongated barrier can then be to one of the anchors so that each barrier extends linearly from the first strip to the second strip.

BRIEF DESCRIPTION OF DRAWINGS

The following drawings are illustrative of particular embodiments of the present invention and therefore do not limit the scope of the invention. The drawings are not necessarily to scale (unless so stated) and are intended for use in conjunction with the explanations in the following detailed description. Embodiments of the invention will hereinafter be described in conjunction with the appended drawings, wherein like numerals denote like elements.

FIG. 5A is a perspective view of a portion of the railing system of FIG. 1 in a dis-mounted state;

FIG. 5B is a perspective view of another portion of the railing system of FIG. 1 in a dis-mounted state;

FIG. 5C is a perspective view of the first or second strip according to an embodiment of the invention;

FIG. 5D is a perspective view of an anchor according to an embodiment of the invention;

FIGS. 13A and 13B are front view a perspective view of a barrier according to an embodiment of the invention.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Embodiments of the invention provide include a railing system for mounting to railings of a fence. The railing system can be mounted to existing railings of a fence quickly and without requiring many tools. Such systems provide a transparent fence allowing a user to be able see past the fence, and at the same time form protective barriers in the form of barriers that can easily be adjusted to ensure that they are securely mounted after installation. Such embodiments create aesthetically pleasing views suitable for use in many modern homes, offices and other buildings.

Figure 1:
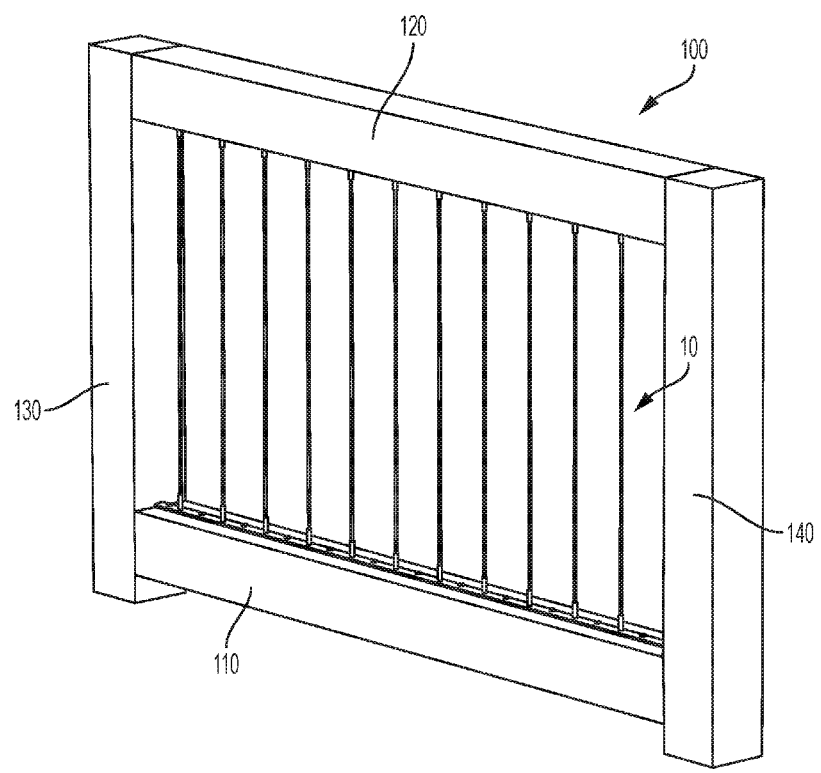
FIG. 1 is a perspective view of a railing system for a fence according to an embodiment of the invention.
Figure 2:
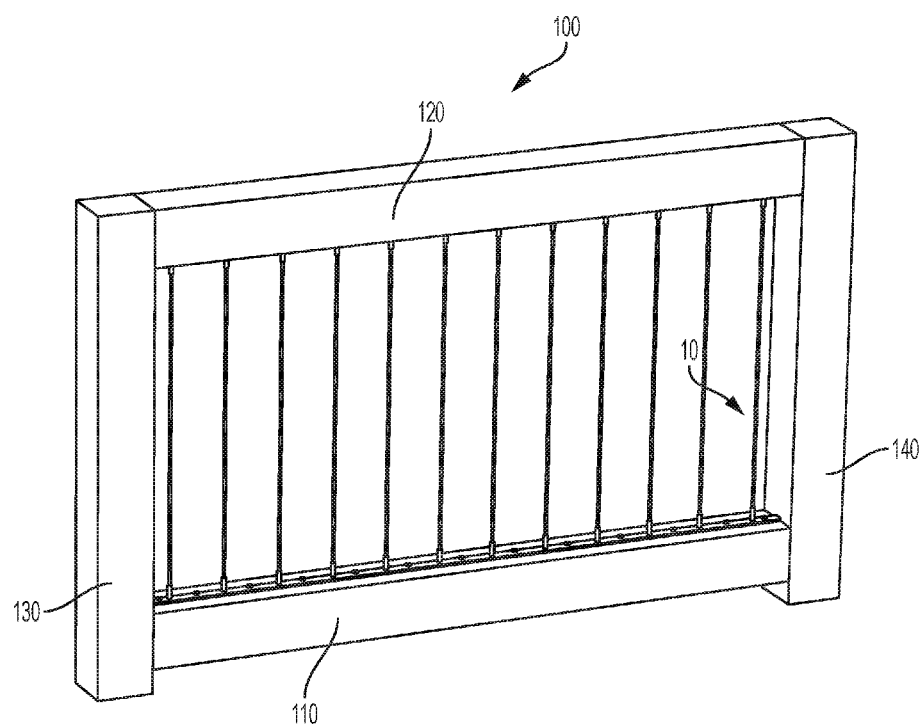
FIG. 2 is a front perspective view of the railing system of FIG. 1.
Figure 11:
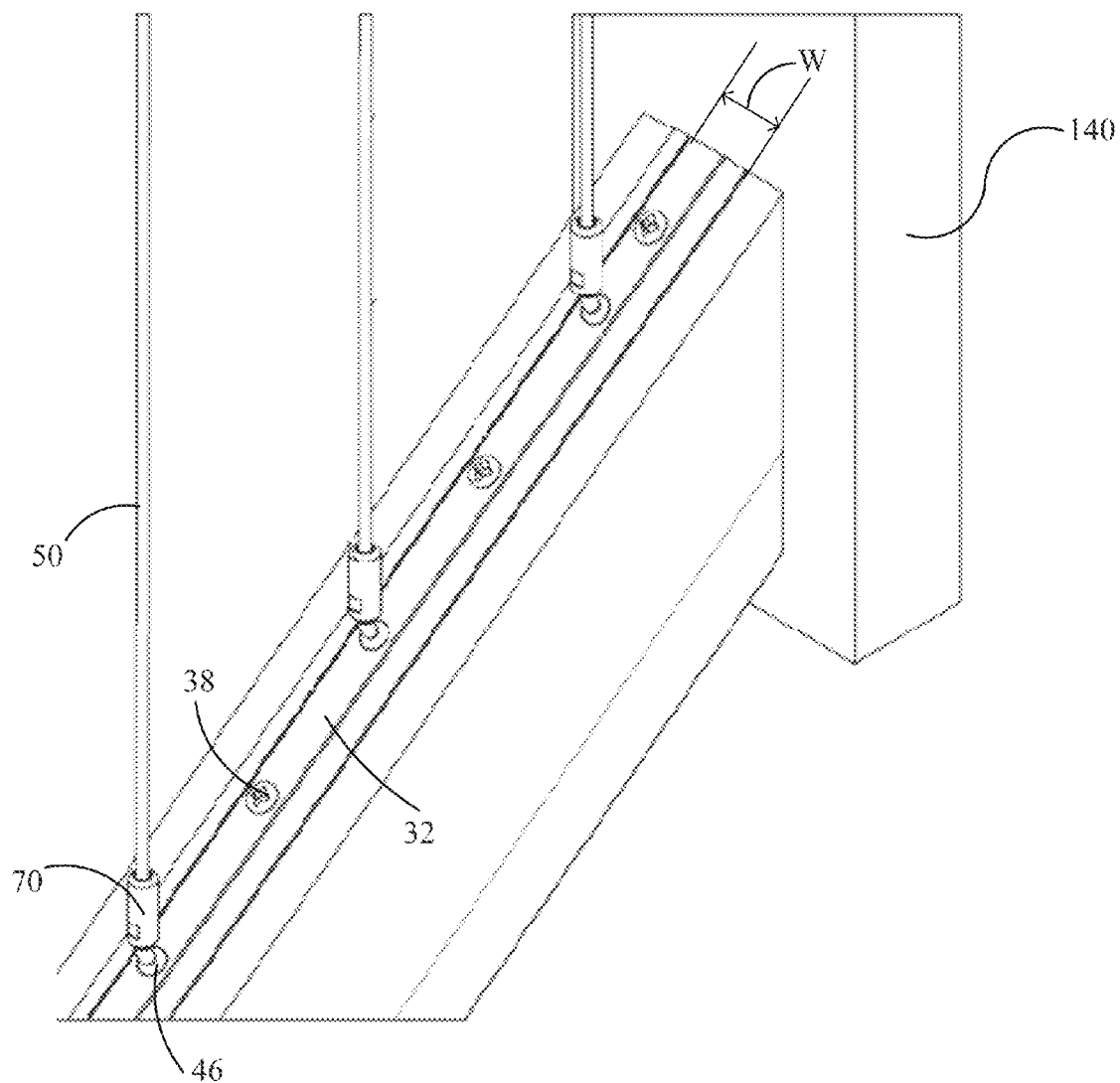
FIG. 11 is front perspective view of a portion of the railing system of FIG. 6.
Figure 12:
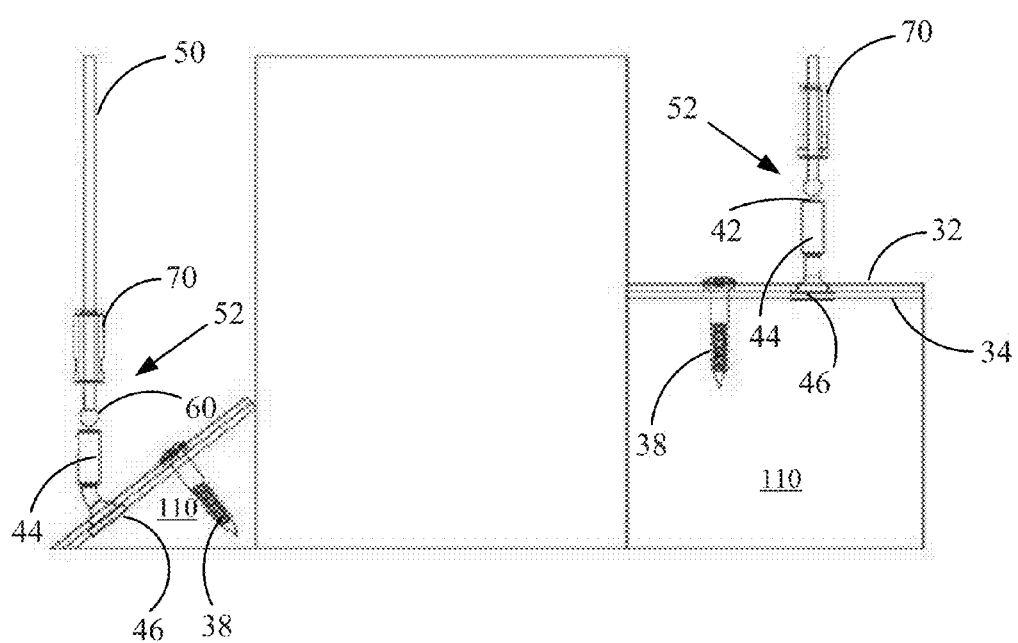
FIG. 12 is a front view of a portion of the railing system of FIG. 6.

FIGS. 1 and 2 are perspective views of a railing system 10 according to an embodiment of the invention. As shown in FIGS. 1 and 2, the railing system 10 can be mounted to existing railings 110, 120, 130, 140 of a fence 100 for use in balconies, decks, stairways and the like. Alternatively, the railing system 10 can function as a stand-alone railing system 10 for use therein. As seen in the close-up perspective views of FIGS. 3 and 4A-4B, the railing system 10 includes a first strip 20 mounted on the existing railing 110 of a fence 100. Referring back to FIG. 2, a second strip 30 can be mounted to the existing railing 120 of the fence 100 opposite to the first strip 20. For instance, in one example, if the first strip 20 is mounted on the bottom railing 110 of the fence 100, the second strip 30 can be mounted on the top railing 120 of the fence 100. Alternatively, in other cases, the first and second strips 20, 30 can be mounted on the left and right side railings 130, 140 of the fence 100. In some exemplary embodiments, the first and second strips 20, 30 can be substantially similar in size and shape. Alternatively, the first and second strips 20, 30 can be of dissimilar sizes and shapes to allow them to be positioned on dissimilarly shaped railings (e.g., in balconies, decks, or inclined and/or spiral stairways). The first and second strips 20, 30 can be mounted flush (e.g., as shown in the view of FIGS. 11 and 12) against the railings 110, 120 to form a vertical, horizontal, angled or otherwise asymmetrically-oriented (e.g., spiral stairway) railing system 10.

Figure 3:
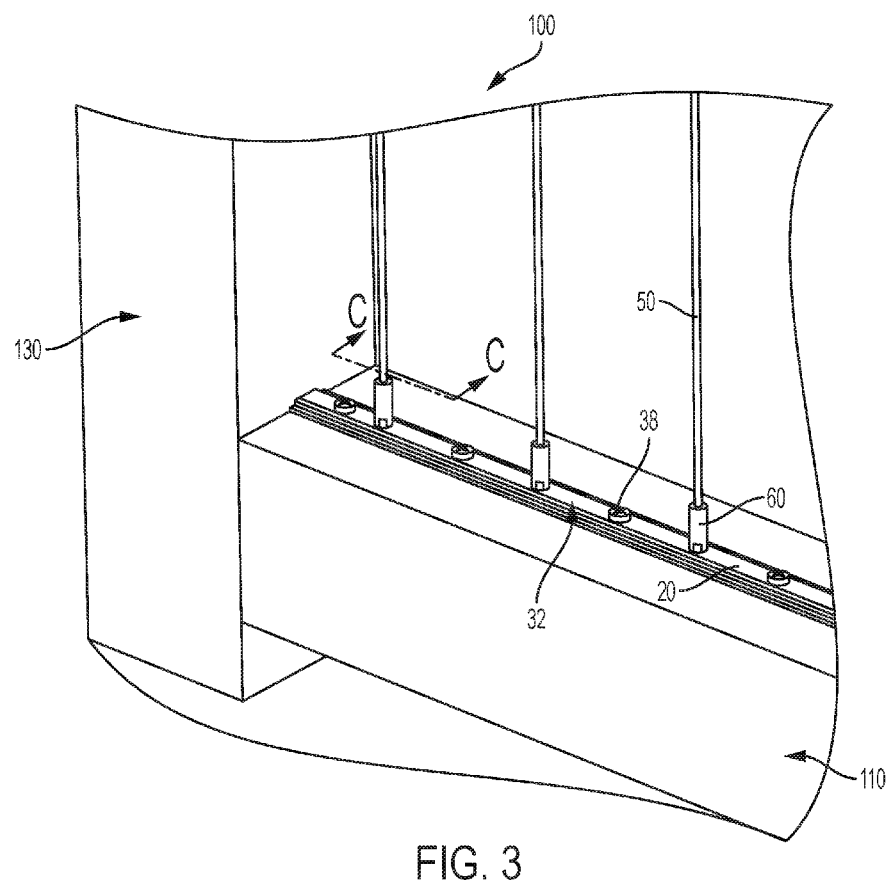
FIG. 3 is a close-up perspective view of a portion of the railing system of FIG. 1.
Figure 4A:
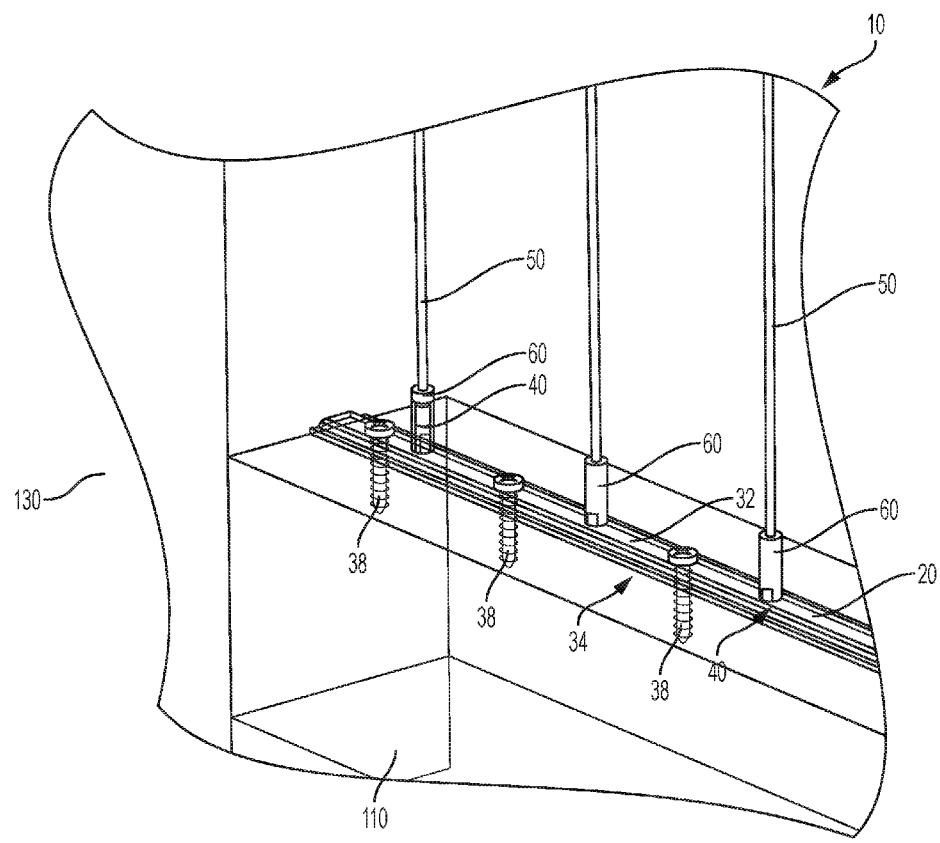
FIG. 4A is a close-up perspective view of the portion shown in FIG. 3, with the railings shown in a transparent view.

FIGS. 5A-5C show various views of the first and second strips 20, 30 mounted to existing railings 110, 120 of a fence 100. As shown in FIGS. 5A-5C, the first and second strips 20, 30 each have a first surface 32 and a second surface 34 opposite the first surface 32. Each second surface 34 of the first and second strip 30 can engage (e.g., via fasteners 38, adhesives, etc.) a railing 110 or 120 of a fence 100. The first and second strips 20, 30 can be positioned and oriented such that they substantially conform to the orientation of the railings 110, 120 on which they are mounted. In one example, the second surface 34 can be generally planar (e.g., without any protrusions, bumps, or other surface projections) to facilitate mounting the first and/or second strips 20, 30 to a planar railing. Alternatively, in other examples, the second surface 34 can be curved or inclined to mount flush against a curved or angled railing. In the illustrated embodiments best seen in FIGS. 5A-5C, the first surface 32 faces away from the railing 110, 120 on which it is mounted, and the second surface 34 faces toward and/or is in opposition to the railing 110, 120 on which the first or second strip 30 is mounted. Additionally, as best shown in FIGS. 3 and 4A, the first surface 32 can either have tracks to capture other components (e.g., fasteners) to not protrude out of the first surface 32. Alternatively, the first surface 32 can be planar with uniform thickness (e.g., without any protrusions, bumps, or other surface projections).

Figure 10:
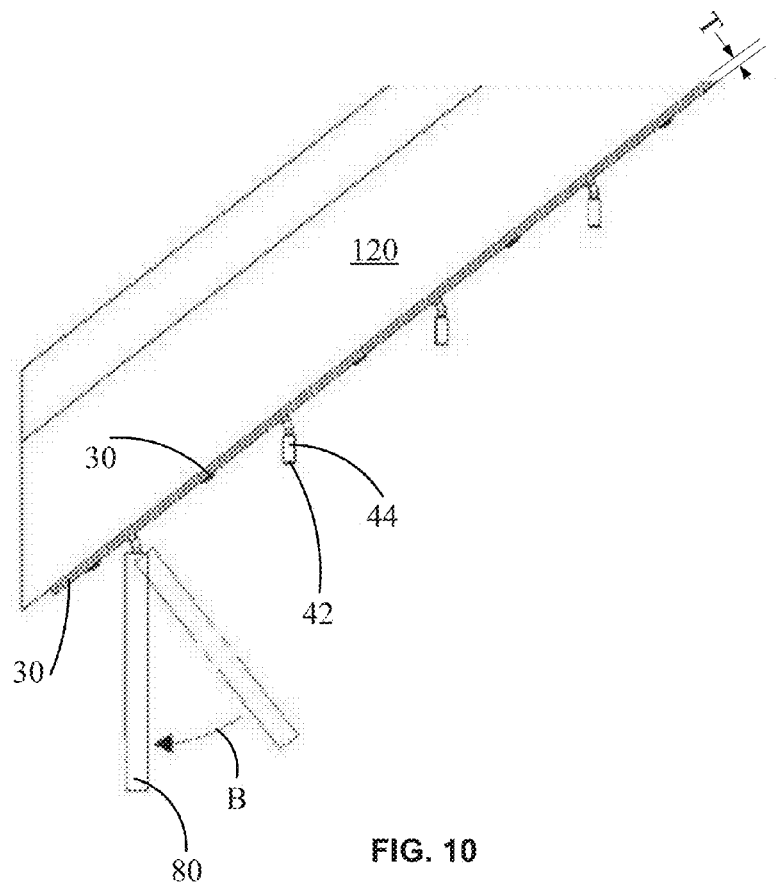
FIG. 10 is a front view of a portion of the railing system of FIG. 6 shown with a bendable anchor.

The first and second strips 20, 30 can each be made of metals (e.g., aluminum, stainless steel, or other metals or alloys). As perhaps best seen in FIG. 5C, the first and second strips 20, 30 can each have a length "L", a width "W" and a thickness "T". The thickness "T" of the first and second strips 20, 30 can be generally uniform along their length "L", as best seen in FIG. 10). Returning to FIGS. 5A-5C, in some cases, the thickness "T" can be uniform along the width "W". The thickness "T" of the first and second strips 20, 30 can be substantially less than the length "L" or the width "W", and the width "W" can be less than the length "L", leading to a shallow and/or narrow profile of the first and second strips 20, 30 when mounted to existing railings of width and thickness greater than the width and thickness of the first and/or second strips 20, 30 respectively. The profile of the first and second strips 20, 30 facilitates the first and second strips 20, 30 from being substantially invisible when mounted on to existing railings 110, 120 of a fence 100, thereby providing aesthetically pleasing views suitable in modern homes and office buildings. Such systems also ensure that a limited quantity of materials is used in fabricating the first and second strips 20, 30, thereby lowering the cost of manufacturing the railing system 10.

In certain embodiments, the first and second strips 20, 30 can be of any desirable length "L" (e.g., between about one foot and about ten feet, and typically about three feet). When mounting to existing railings 110, 120 of a predetermined length, the first and second strips 20, 30 can then be cut to the predetermined length of the existing railing. The width "W" of the first and second strips 20, 30 can generally be less than the width of the existing railings 110, 120 on which the first and second strips 20, 30 are mounted. In one example, the width "W" of the first and second strips 20, 30 can be on the order of a few inches. The first and second strips 20, 30 can have any width (e.g., substantially equal to, or greater than, or less than the width of the railings 110, 120). As mentioned elsewhere herein, the thickness "T" is substantially less than the length "L" and the width "W" of the first and second strips 20, 30. The thickness "T" can be between about 1 millimeter and about 10 millimeters, and in some exemplary embodiments, is about 2 millimeters. Other ranges of thickness are also contemplated. In some cases, the railing system 10 can be provided with several strips of various standard dimensions (e.g., several lengths, widths and/or thicknesses as a kit) to mount to various types and geometries of railings 110, 120.

Referring back to FIGS. 4A-4B, the first and second strips 20, 30 each can have a plurality of openings 36 extending therethrough. As perhaps best seen in FIGS. 5A and 5C, the openings 36 can be equally spaced although they may have a non-uniform spacing. Each opening receives a fastener 38 (e.g., wood screws, nuts and bolts, push-connect or similar fasteners) to engage the first and second strips 20, 30 to the existing railings 110, 120 of the fence 100. In the cross-sectional view of FIG. 4B, the fastener 38 is a wood-screw. In this example, a user can engage the first and second strips 20, 30 to the existing railing of the fence by positioning the first and second strips 20, 30 to the railings 110, 120, respectively, positioning the plurality of fasteners 38 in the openings 36 of the first and second strips 20, 30, and then fastening the first and second strips 20, 30 to the railings 110, 120 (e.g., by driving the fasteners 38, via the plurality of openings 36, into the first and second railing via a power tool). Alternatively, any other fastener (e.g., hook and loop) known in the art can be used to engage the first and second strips 20, 30 to existing railing 110, 120. Alternatively, the first and second strips 20, 30 can be bonded (e.g., by welding, soldering, or using adhesives) to existing railing 110, 120.

Prior to positioning and engaging the first and second strips 20, 30 on the existing railings 110, 120, a plurality of anchors 40 may be inserted to openings 36 in the first and the second strip 30 to anchor 40 the first and second strips 20, 30 when engaged with the railings 110, 120. The anchors 40 may be positioned in the openings 36 in any configuration. In the embodiments illustrated in FIG. 5A-5B, each anchor 40 is placed in an opening 36 interspersed between openings 36 that receive a fastener 38. However, this may not be the case in other embodiments where anchors 40 are positioned in adjacent openings 36. As seen in FIG. 5D, each anchor 40 can have a leading edge 42, a shank 44 and a flared portion 46. The leading edge 42 and the shank 44 can have a cross-sectional area "A2" less than a cross-sectional area of the respective opening (not shown) of the first or second strip 30 to permit the leading edge 42 to be inserted into the opening. When inserted, the leading edge 42 and the shank 44 extend in a direction from the second surface 34 to the first surface 32, through a respective opening. The flared portion 46 can have a cross-sectional area "A1" greater than the cross-sectional area of the respective opening (not shown) of the first or second strip 30 to prevent passage of the flared portion 46 through the respective opening. The flared portion 46 anchors each anchor 40 against the second surface 34 of the one of the first and second strips 20, 30. In some embodiments, the flared portion 46 of the anchor 40 is beveled or chamfered to prevent sharp edged anchors. Any number of anchors 40 can be used, and in the illustrated embodiments shown in FIGS. 5A-5C, the spacing between the openings 36 receiving each anchor 40 is about one inch. While a uniformly spaced configuration of openings 36 is shown in FIGS. 5A-5C, the anchors 40 may be positioned in a staggered configuration e.g., in non-uniformly spaced openings 36).

Figure 6:
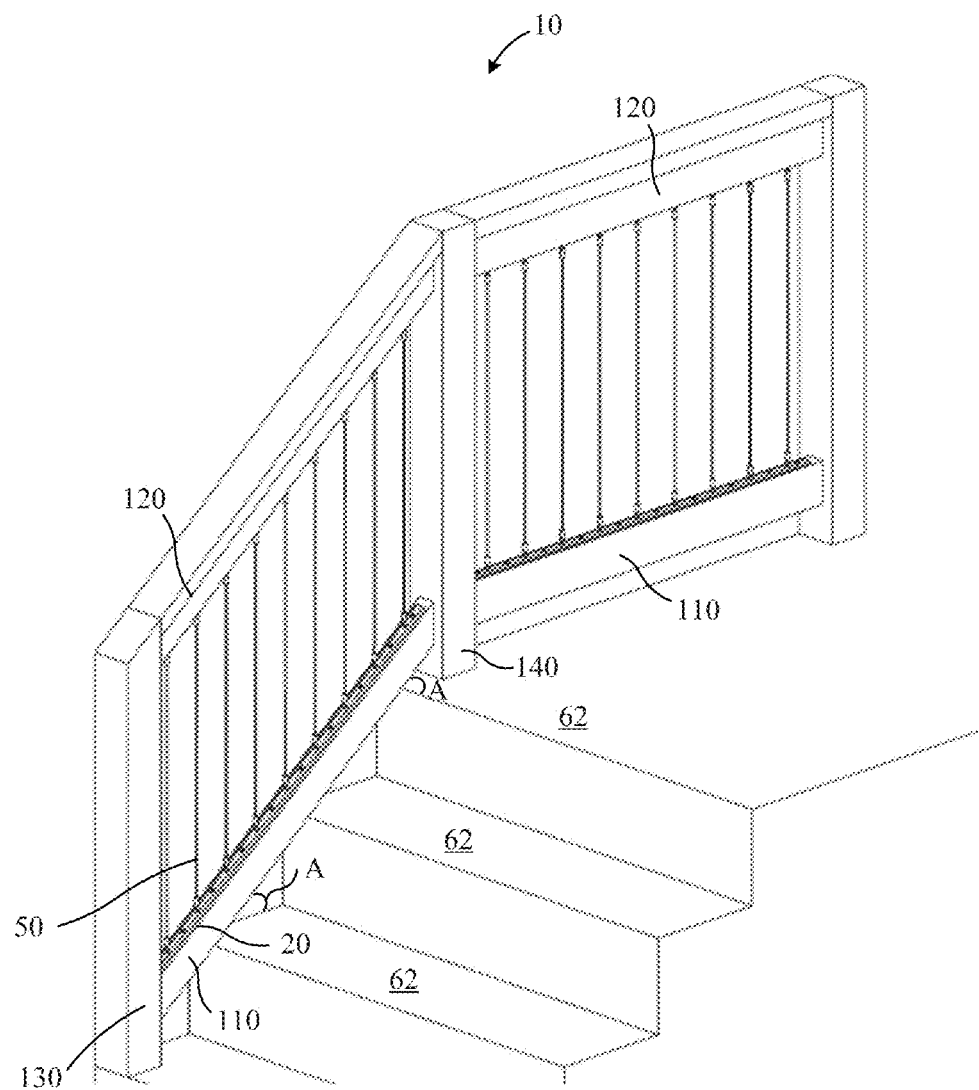
FIG. 6 is a perspective view of a railing system for a stairway according to an embodiment of the invention.

With continued reference to FIGS. 5C and 5D, the leading edge 42 of each anchor 40 receives an elongated barrier 50. In some examples, the barrier 50 can be a filling. The elongated barrier 50 can have a fixed length to extend from the first strip 20 to the second strip 30 when mounted to respective fence railings 110, 120. Each barrier 50 can have a first end 52 and a second end 54. In one example, the first end 52 can be connectable to one of the anchors 40 extending from and/or anchored to the first strip 20 and the second end 54 can be connectable to one of the anchors 40 extending from and/or anchored to the second strip 30. Each barrier 50, when connected to respective anchors 40, can extend linearly from the first strip 20 to the second strip 30. While the embodiment illustrated in FIGS. 1-4B show the barriers 50 oriented in a generally vertical direction (e.g., as balusters), the barriers 50 can be oriented in any configuration. For example, the barriers 50 may be oriented horizontally, extending between the left side railing 130 and the right side railing 140 seen in FIGS. 1 and 2. Alternatively, the railings 110, 120 can be angled with respect to a horizontal or a vertical plane (e.g., the stairway railings shown in FIG. 6). In such cases, the barriers 50 can either be extending vertically as shown in FIG. 6, or can be inclined with respect to the horizontal or vertical plane, to form a protective fence for stairways.

In the embodiments illustrated in FIG. 5C, the barriers 50 are cylindrical with a diameter substantially less than their length. However, the barriers 50 can be of any shape (e.g., having a square, hexagonal, octagonal, or irregular cross-section when viewed in the length-wise direction). The barriers 50 can be of any length allowing them to extend linearly in any orientation (horizontal, vertical or angular orientation) between railings 110, 120. In some cases, the barriers 50 can have a length that equals the spacing between adjacent railings between which the barriers 50 extend linearly, when the railing system 10 is assembled (e.g., when the barriers 50 are anchored to the first and second strips 20, 30 via the plurality of anchors 40). In many cases, fences for balconies and stairways are of standard dimensions. For instance, the top and bottom railings (best seen in FIGS. 1 and 2) can be spaced apart by a distance of about 30 inches. In this example, the barriers 50 can have a length of about 30 inches to extend linearly and vertically between the top and bottom railings when assembled. Alternatively, if the barriers 50 are to be oriented in a horizontal configuration, they can have a length that equals the spacing between the left and right side railings shown in FIGS. 1 and 2.

With continued reference to FIGS. 1 and 2, in some exemplary embodiments, the barriers 50 can either be cables or rods. In embodiments wherein the barriers 50 are cables, the barriers 50 can be substantially flexible (e.g., with respect to the existing railings). In embodiments wherein the barriers 50 are rods, the barriers 50 are substantially rigid in comparison to the existing railings and/or first and second strips 20, 30. In such embodiments, the barriers 50 can be hollow or solid. The cable or rod can be pre-cut to a predetermined length. In some cases, the railing system 10 can be provided with several cables or rods of various standard dimensions (e.g., several lengths and diameters and/or thicknesses as a kit) and a user may cut (e.g., with a wire-stripper, saws, or other cutting tools) the cable or rod to the desired length. As mentioned elsewhere herein, many fences are of standard dimensions, wherein the spacing between adjacent railings 110, 120, 130 and 140 is known. In such cases, the predetermined length of the pre-cut rod or cable can equal the spacing between railings between which the barriers 50 can extend linearly when assembled. Alternatively, the user can cut the rod or the cable to any desired dimension. In some exemplary embodiments, when the railing system 10 is assembled (e.g., when the barriers 50 are anchored to the first and second strips 20, 30 via the plurality of anchors 40), the barriers 50 do not sag. For instance, the barriers 50 can be held in tension between the first and second strips 20, 30 by the plurality of anchors 40, such that the barriers 50 are substantially linear when anchored to the first and second strips 20, 30. Such barriers 50 can provide aesthetically pleasing fences for stairways, decks, and balconies (e.g., by allowing a view past the fence).

Figure 4B:
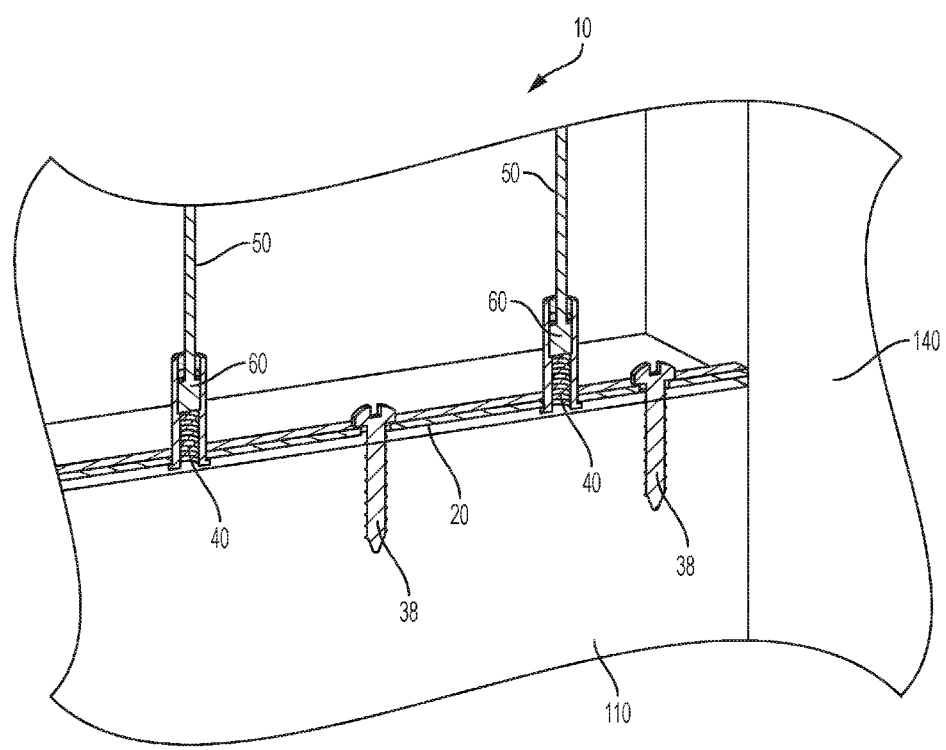
FIG. 4B is a cross-sectional view of the railing system shown in FIG. 3 taken along the plane C-C.

In some embodiments, the first and second ends 52, 54 of each barrier 50 have a stopper 60 to be received by or engage with an anchor. In some embodiments, the stopper 60 is integrally formed with the barrier 50. Alternatively, each stopper 60 can be fastened (e.g., threaded connection, with a fastener, or a complementary connector), or connected via a friction or press fit with the first and second ends 52, 54 of the barriers 50. Alternatively, each stopper 60 can be welded or adhered to the first and second ends 52, 54 of the barriers 50. In the embodiments illustrated in FIG. 4B, the stopper 60 is of cylindrical shape. Alternatively, the stopper 60 can be spherical (as illustrated in FIGS. 12-13B), cubical, or other shapes. In an exemplary embodiment illustrated in FIG. 4B, the stopper 60 can be sized such that it is received by an anchor 40 of the plurality of anchors 40. In the illustrated embodiment shown in FIG. 4B, at least a portion of the shank 44 of each anchor 40 is hollow. At least a portion of the hollow portion of each anchor 40 has an internal diameter greater than the external diameter of the stopper 60. In some embodiments, at least a portion of the hollow portion of each anchor 40 has an internally threaded portion for fastening the first barrier 50 to the first and second strips 20, 30. In such embodiments, the stopper 60 comprises an externally threaded portion engaging with the internally threaded portion of the anchor. While the illustrated embodiment in FIG. 4B shows the shank 44 having an internally threaded hollow portion and the stopper 60 having an externally threaded portion, the shank 44 of the anchor 40 and the stopper 60 can be configured such that the stopper 60 has an internally-threaded hollow portion for receiving an externally threaded portion of the shank 44 of the anchor. In such cases, the shank 44 may be hollow or solid. Other possible engagement between the anchor 40 and the stopper 60, such as a frictional or press fit, complementary connectors (e.g., via a dovetail joint), push-connect fasteners (e.g., flexible tabs, buttons, ribs, and the like which may be compressed and released to form a tight fit), and combinations thereof are also contemplated. Alternatively, non-releasable connection (e.g., bonding with an adhesive, welding or soldering the first and second ends 52, 54 with the anchors 40 once the barriers 50 are brought into contact with the anchors 40) between the anchors 40 and the first and second ends 52, 54 of the barriers 50 are also contemplated.

As mentioned elsewhere herein, the barriers 50 can be in a generally vertical orientation, a generally horizontal orientation, or in any angular orientation. In such embodiments, the first and second strips 20, 30 are in a generally horizontal orientation and the shank 44 of the anchors 40 extends in a direction generally perpendicular to the second surface 34 of the first and second strips 20, 30. Such embodiments are useful in constructing fences for balconies, deck, and the like. In some embodiments, the first and second strips 20, 30 are in a generally non-horizontal orientation. Such embodiments can be useful for constructing stairways, as illustrated in FIGS. 6-8.

Figure 7:
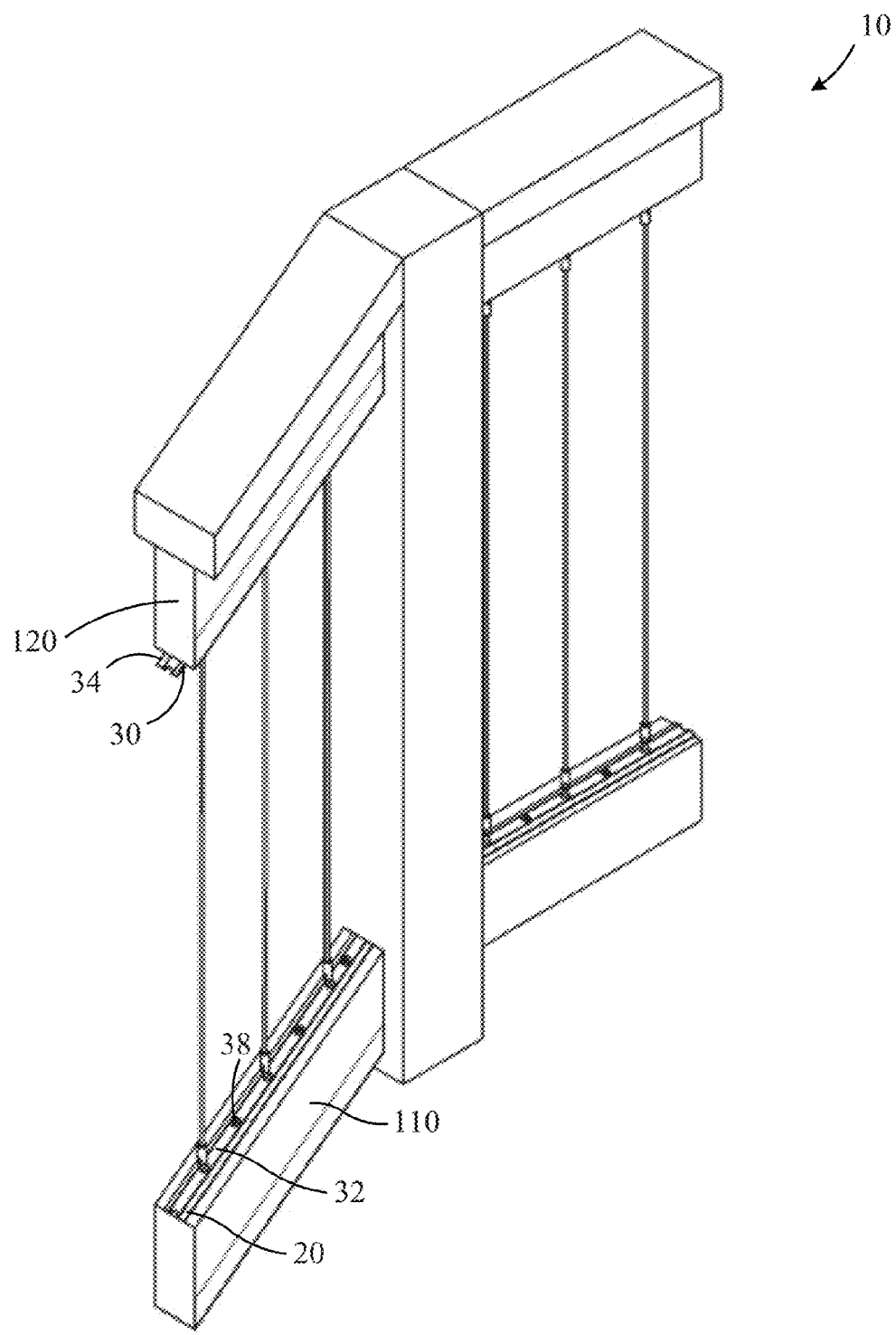
FIG. 7 is a perspective view of a portion of the railing system of FIG. 6.
Figure 8:
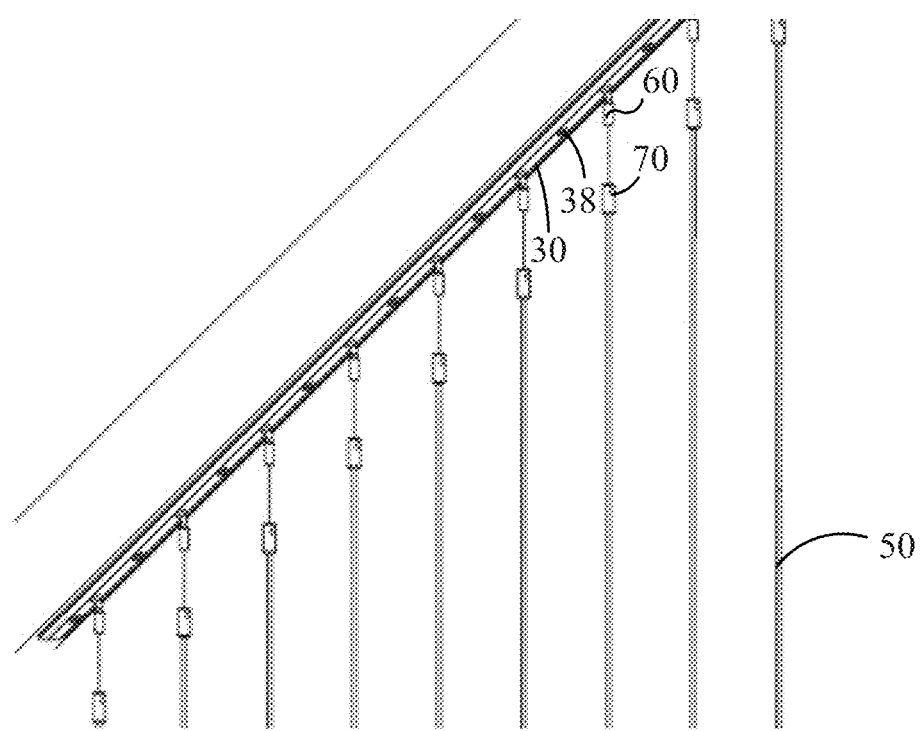
FIG. 8 is a front view of a portion of the railing system of FIG. 6.

In the illustrated embodiment shown in FIGS. 6 and 7, the first and second strips 20, 30 are placed in an angular orientation for a portion of the stairway, rather than in a horizontal orientation shown in FIGS. 1 and 2. In such cases where the first and second strips 20, 30 are in an angular orientation (e.g., at an angle "A" between about 1 degree and about 85 degrees, with respect to a horizontal plane, such as the treading surface 62 of the stairs), the barriers 50 can be horizontal, vertical or angled with respect to the railings 110, 120 and/or first and second strips 20, 30. In such embodiments, the shank 44 of each anchor 40 can extend in a direction non-perpendicular with respect to the second surface 34 of the first or second strip 30 through which the anchor 40 extends. For instance, the shank 44 can be bendable with respect to the flared portion 46 of each anchor. The shank 44 can be bendable (e.g., with a bending tool 80) such that it forms a desired angle with respect to the flared portion 46 and/or the second surface 34 of one of the first or second strips 20, 30 from which the anchor 40 extends. The shank 44 of the anchor 40 positioned on the other of the first or second strip 30 can also be bendable such that it forms a desired angle (e.g., between about 1 degree and about 85 degrees) with respect to the flared portion 46 and/or the second surface 34 of the other of the first or second strips 20, 30. The first and second ends 52, 54 of the barriers 50 can be connected to the angled shanks 44, thereby forming a fence with the barriers 50 in the desired orientation (e.g., horizontal, vertical, or angular).

FIGS. 8-14 show a railing system 10 with a plurality of barriers 50 according to another embodiment of the invention. In the illustrated embodiment best seen in FIGS. 13A-13B, the barriers 50 are cylindrical with a diameter "D" and a length "H". Of course, any other cross-sectional shape of the barrier 50 (e.g., square, hexagonal, octagonal, rectangular, etc.) along the lengthwise direction is also contemplated. Each barrier 50 slidingly engages with a pair of sleeves 70. Alternatively, each barrier 50 can be fixedly coupled to a pair of sleeves 70. In such cases, the sleeves 70 can be positioned toward the first and second ends 52, 54 of each barrier 50. Each sleeve 70 can be connectable with the shank 44 of a respective anchor. Each sleeve 70 can have a hollow portion. In such embodiments, the first and second ends 52, 54 can be receivable by the hollow portion of a respective sleeve 70. Each sleeve 70 can be connectable with a respective anchor. Once connected, the engagement between the sleeves 70 and the anchors 40 facilitate anchoring the barriers 50 to the first and second strips 20, 30.

Figure 9:
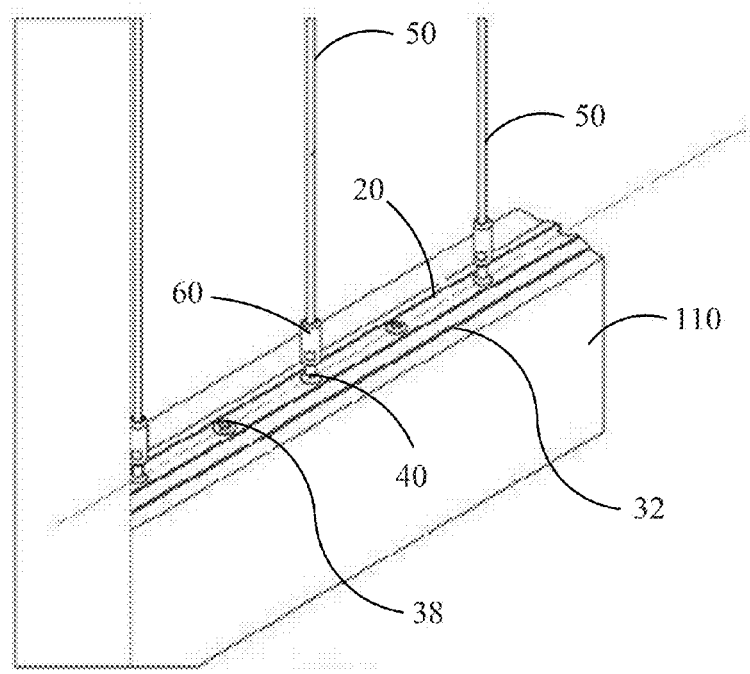
FIG. 9 is a perspective view of a portion of the railing system of FIG. 6.

As mentioned previously, each barrier 50 includes a pair of stoppers 60 at its first and second ends 52, 54. In the illustrative (best seen embodiments in FIG. 12), the stoppers 60 are spherical, and can be welded to or integrally formed with (e.g., by molding if the barriers 50 are fabricated from polymer, by casting or machining if the barriers 50 are fabricated from metals) the barrier 50. In the illustrated embodiments shown in FIG. 12, the hollow portion of each sleeve 70 has an internal cross-sectional area (e.g., along its lengthwise direction) that is sufficiently greater than an external cross-sectional area of the stoppers 60, so that the stoppers 60 can be received by and/or pass through the hollow portion of the sleeve 70. For instance, if the sleeves 70 are cylindrical with an annular hollow portion, the internal diameter of the annulus can be greater than the external diameter of a cylindrical or spherical stopper 60. As shown in the illustrated embodiments, the barriers 50 typically have an outer cross-sectional area less than the outer cross-sectional area of the stoppers 60. The barriers 50 can therefore pass through the hollow portions of the sleeves 70, as illustrated in FIG. 8. The stoppers 60 can be seated in the anchors 40 as described previously (e.g., with respect to FIG. 4B) and the sleeves 70 can cover the stopper 60 and/or shank 44 of the anchor, as illustrated in FIGS. 9 and 11. Alternatively, the stoppers 60 can be received by and seated in the hollow portion of each sleeve 70.

Figures 14A, 14B:
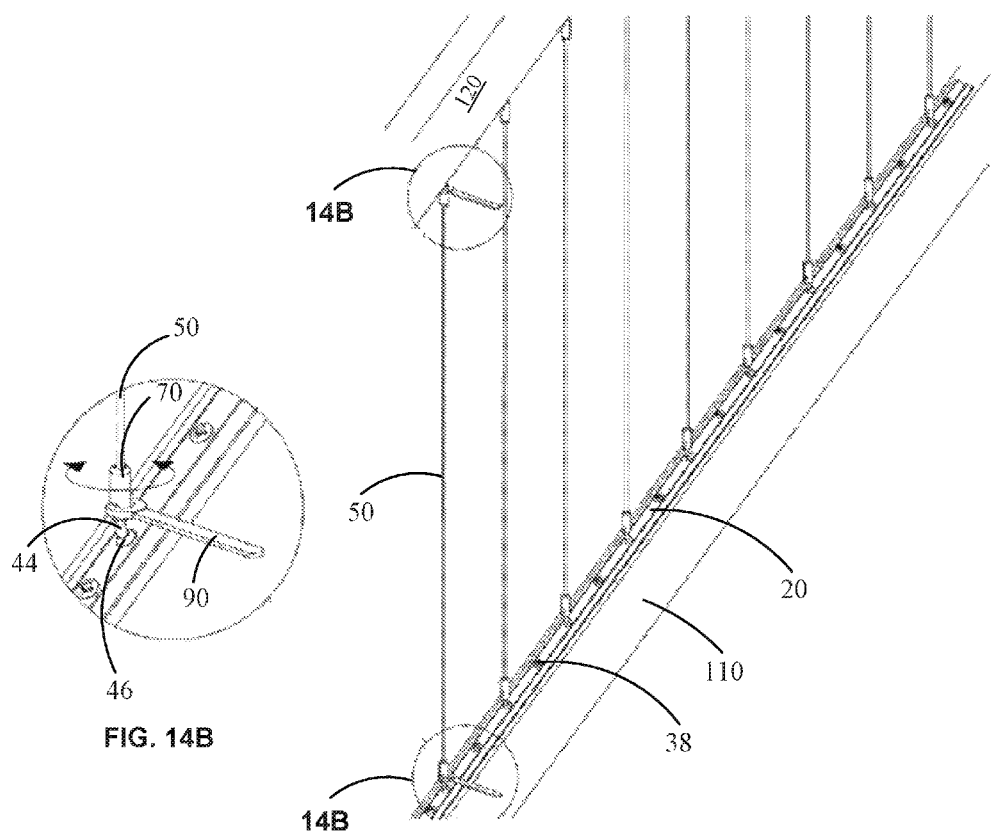
FIG. 14A is a perspective view of a portion of the railing system of FIG. 6 showing the railing system in a mounted state.
FIG. 14B is an enlarged view of a portion 14B circled in FIG. 14A.

Each sleeve 70 can engage with an anchor 40 extending from an opening of the first or second strip 30, and thereby connect each barrier 50 to the first and second strips 20, 30. As mentioned herein, the shank 44 of each anchor 40 in embodiments described herein can be bendable, as shown in FIG. 10 to orient the first and second strips 20, 30 and/or barriers 50 in any desired orientation (e.g., horizontal, vertical or angular orientations). In such cases, prior to engaging with the sleeve 70, the shank 44 of the anchor 40 can be bent (e.g., with a bending tool 80) to a desired angle (e.g., angle "B" as shown in FIG. 10). In some cases, the angle "B" can equal the angle "A" shown in FIG. 6. The sleeves 70 and anchors 40 can then engage by any known means. In one example, the sleeves 70 and anchors 40 can engage via a threaded connection. For instance (as shown in FIG. 14), each anchor 40 can have an externally threaded portion that can engage (e.g., by applying a torque) with an internally threaded portion of the sleeve 70. In such embodiments, the hollow portion of sleeve 70 can have internal threads for at least a portion of the length of the sleeve 70. Alternatively, the sleeve 70 can be externally threaded and can engage with an internally threaded portion of the anchor. In such embodiments, the anchor 40 can have a hollow portion comprising internal threads to receive and engage with the externally threaded portion of the sleeve 70. Alternatively, other known means such as frictional or press fit, complementary connectors (e.g., via a dovetail joint), push-connect fasteners (e.g., flexible tabs, buttons, ribs, and the like which may be compressed and released to form a tight fit), and combinations thereof are also contemplated. Alternatively, non-releasable connection (e.g., bonding with an adhesive, welding or soldering the sleeves 70 with the anchors 40 once the barriers 50 are brought into contact with the anchors 40) between the anchors 40 and the sleeves 70 are also contemplated.

Certain embodiments of the invention may include a method of mounting a railing system 10 to railings of a fence 100. The method can involve the step of providing a railing system 10 such as those described herein. A desired number of anchors 40 can be positioned on the openings 36 of the first and second strips 20, 30 such that the leading edge 42 and shank 44 of each anchor 40 extends in a direction from the second surface 34 to the first surface 32. When positioned, the flared portion 46 of each anchor 40 is prevented from passing through the respective opening so that the flared portion 46 anchors the anchor 40 against the second surface 34 of the one of the first and second strips 20, 30.

Once the anchors 40 are positioned in the openings 36, the first and second strips 20, 30 can be mounted to respective railings 110, 120 of the fence 100 such that each second surface 34 faces and engages a respective railing of a fence (e.g., as shown in FIG. 5A). Once mounted, the flared portions 46 of each anchor 40 being are captured between first or second strip 30 and the respective railing 110, 120. In some embodiments, the mounting fixes the flared portion 46 of each anchor 40 against the respective fence railing 110, 120. As shown in FIG. 5B, and described herein, the first and second strips 20, 30 are mounted to respective railings 110, 120 by fasteners 38, or bonded therewith (e.g., by adhesives).

The shank 44 of each anchor 40 can then be bent with respect to its flared portion 46 to a desired angle to have the desired angular orientation. In some embodiments, the angle between the bent shank 44 and the flared portion 46 is between about 1 degree and about 85 degrees. In some embodiments, the method of mounting the railing system 10 to the railings 110, 120 of a fence 100 includes connecting a bending tool 80 as described herein (e.g., as shown in FIG. 10) to the leading edge 42 of one of the anchors 40, grasping and manipulating the bending tool 80 to bend the shank 44 of the one of the anchors 40 with respect to its flared portion 46, and disconnecting the bending tool 80 from the leading edge 42 of the one of the anchors 40. Once the anchor 40 is bent to a desired angle, the first and second ends 52, 54 of each elongated barrier 50 can be connected to one of the anchors 40 (e.g., via a threaded engagement by applying a torque with a tool such as a wrench 90, as shown in FIG. 14) so that each barrier 50 extends linearly from the first strip 20 to the second strip 30.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention.

What is claimed is:

1. A railing system for mounting to fence railings, comprising:
   a first strip and a second strip, the first and second strips each having a first surface and a generally planar second surface opposite the first surface,
   the first and second strips adapted to be mounted to respective fence railings, each second surface adapted to face and engage a fence railing,
   the first and second strips each defining a length and a width and having a thickness substantially less than the length or the width,
   the thickness of the first and second strips being generally uniform along the length,
   the first and second strips each having a plurality of openings extending therethrough;
   a plurality of anchors, each anchor having a leading edge, a shank and a flared portion,
   the leading edge and the shank having a cross-sectional area less than a cross-sectional area of a respective opening of the plurality of openings to permit the leading edge and the shank to extend, in a direction from the second surface to the first surface, through the respective opening of one of the first and second strip, the flared portion having a cross-sectional area greater than the cross-sectional area of the respective opening to prevent passage of the flared portion through the respective opening and anchor the anchor against the second surface of the one of the first and second strips, the shank of each anchor being bendable with respect to the flared portion of each anchor;

a plurality of elongated barriers, each barrier having a fixed length to extend from the first strip to the second strip when mounted to respective fence railings, each barrier having a first end and a second end, the first end being connectable to one of the anchors when anchored to the first strip and the second end being connectable to one of the anchors when anchored to the second strip, each barrier, when connected to respective anchors, extending linearly from the first strip to the second strip.

2. The railing system of claim 1, wherein the shank of each anchor extends in a direction non-perpendicular with respect to the second surface of the first or second strip through which the anchor extends.

3. The railing system of claim 1, wherein the first and second ends of each barrier having a stopper.

4. The railing system of claim 3, wherein the stopper is of cylindrical shape.

5. The railing system of claim 4, wherein the stopper is welded to or integrally formed with the barrier.

6. The railing system of claim 4, wherein the shank of each anchor has an internally threaded portion for fastening the first barrier to the first and second strips.

7. The railing system of claim 6, wherein the stopper comprises an externally threaded portion, the externally threaded portion of the stopper engaging with the internally threaded portion of the anchor.

8. The railing system of claim 1, wherein the barrier is one of a cable and a rod, wherein the cable or rod is hollow or solid.

9. The railing system of claim 8, wherein the barrier is a cable pre-cut to a predetermined length.

10. The railing system of claim 1, wherein the flared portion of the anchor is beveled.

11. A railing system for mounting to fence railings, comprising:

a first strip and a second strip, the first and second strips each having a first surface and a generally planar second surface opposite the first surface, the first and second strips adapted to be mounted to respective fence railings, each second surface adapted to face and engage a fence railing, the first and second strips each defining a length and a width and having a thickness substantially less than the length or the width, the thickness of the first and second strips being generally uniform along the length, the first and second strips each having a plurality of openings extending therethrough;

a plurality of anchors, each anchor having a leading edge, a shank and a flared portion, the leading edge and the shank having a cross-sectional area less than a cross-sectional area of a respective opening of the plurality of openings to permit the leading edge and the shank to extend, in a direction from the second surface to the first surface, through the respective opening of one of the first and second strip, the flared portion having a cross-sectional area greater than the cross-sectional area of the respective opening to prevent passage of the flared portion through the respective opening and anchor the anchor against the second surface of the one of the first and second strips;

a plurality of sleeves, each sleeve being connectable with the shank of a respective anchor, each sleeve having a hollow portion; and a plurality of elongated barriers, each barrier having a fixed length to extend from the first strip to the second strip when mounted to respective fence railings, each barrier having a first end and a second end, the first and second ends being receivable by the hollow portion of a respective sleeve, the first end being connectable to the first strip and the second end being connectable to the second strip when received by the hollow portion of a respective sleeve, each barrier, when connected to respective strips, extending linearly from the first strip to the second strip.

12. The railing system of claim 11, wherein each anchor comprises an externally threaded portion for fastening the first barrier to the first and second strips.

13. The railing system of claim 12, wherein each sleeve comprises an internally threaded portion for engaging with the externally threaded portion of each anchor.

14. The railing system of claim 11, wherein the first and second ends each comprise a spherical stopper coupled or integrally formed with the first and second ends, the spherical stopper being received by a respective hollow portion of each sleeve.

15. The railing system of claim 11, wherein each barrier of the plurality of barriers are in a generally vertical orientation.

16. The railing system of claim 11, wherein the first and second strips are in a generally horizontal orientation.

17. The railing system of claim 11, wherein the first and second strips are in a generally non-horizontal orientation.

18. A railing system for mounting to fence railings, comprising:

a first strip and a second strip, the first and second strips each having a first surface and a generally planar second surface opposite the first surface, the first and second strips adapted to be mounted to respective fence railings, each second surface adapted to face and engage a fence railing, the first and second strips each defining a length and a width and having a thickness substantially less than the length or the width, the thickness of the first and second strips being generally uniform along the length, the first and second strips each having a plurality of openings extending therethrough;

a plurality of anchors, each anchor having a shank having a cross-sectional area less than a cross-sectional area of a respective opening of the plurality of openings, thereby permitting the shank to extend, in a direction from the second surface to the first surface, through the respective opening of one of the first and second strip;

a plurality of sleeves, each sleeve being connectable with the shank of a respective anchor, each sleeve having a hollow portion; and a plurality of elongated barriers, each barrier having a fixed length to extend from the first strip to the second strip when mounted to respective fence railings, each barrier having a first end and a second end, the first and second ends being receivable by the hollow portion of a respective sleeve, the first end being connectable to the first strip and the second end being connectable to the second strip when received by the hollow portion of a respective sleeve, each barrier, when connected to respective strips, extending linearly from the first strip to the second strip.

* * * * *